United States Patent Office 3,776,973
Patented Dec. 4, 1973

3,776,973
OLEFIN CONVERSION USING COMPLEXES OF Mn, Tc, AND Re WITH ORGANOALUMINUM
Edmund T. Kittleman and Ernest A. Zuech, Bartlesville, Okla., assignors to Phillips Petroleum Company
No Drawing. Continuation-in-part of abandoned application Ser. No. 75,800, Sept. 24, 1970, which is a division of application Ser. No. 717,026, Mar. 28, 1968, now Patent No. 3,558,515, which in turn is a continuation-in-part of abandoned application Ser. No. 635,669, May 3, 1967. This appplication June 23, 1971, Ser. No. 156,045
Int. Cl. C07c 3/62
U.S. Cl. 260—683 D    13 Claims

ABSTRACT OF THE DISCLOSURE

A process for the conversion of internal olefinic hydrocarbons according to the olefin reaction (e.g., the olefin disproportionation reaction) and for the double bond isomerization of terminal olefinic hydrocarbons by contacting the olefinic hydrocarbon with a catalyst comprising a coordination complex of manganese, technetium, or rhenium, together with an organoaluminum adjuvant.

---

This application is a continuation-in-part of copending application Ser. No. 75,800, filed Sept. 24, 1970, now abandoned, which is a divisional of copending application Ser. No. 717,026, filed Mar. 28, 1968, now Pat. 3,558,515 issued Jan. 26, 1971, which is a continuation-in-part of copending application Ser. No. 635,669, filed May 3, 1967, now abandoned.

This invention relates to the conversion of olefin hydrocarbons and to a homogeneous catalyst for such conversion. In one aspect this invention relates to the olefin reaction. In another aspect it relates to the conversion of olefins to other olefins having different molecular weights. In an additional aspect, the invention relates to the double bond isomerization of terminal olefin to internal olefins. In still another aspect it relates to a homogeneous, multicomponent catalyst comprising a coordination complex of manganese, technetium or rhenium, together with a catalytic adjuvant comprising an organometal compound for converting olefins to other olefins having molecular weights different from that of the starting olefin.

The term olefin reaction, as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can produce higher molecular weight materials;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

New catalytic proceses have been discovered in recent years for the conversion of olefins to other olefins including products of both higher and lower molecular weight whereby olefins of relatively low value are converted to olefins of higher value. Such conversions have heretofore been carried out using heterogeneous catalysts comprising compounds such as compounds of molybdenum or tungsten and generally associated with solid materials such as alumina or silica. It has now been found that these olefin conversions can be carried out in a substantially homogeneous state using, as catalyst, selected coordination complexes of manganese, technetium or rhenium in combination with suitable organometal catalytic adjuvants to produce olefins of increased value including solid products, for example, rubber, suitable for the manufacture of tires, wire coating, footwear and other industrial products.

It is an object of this invention to provide a method and a homogeneous catalyst system for the conversion of olefin hydrocarbons. It is also an object of this invention to provide a homogeneous catalyst comprising a coordinating complex of manganese, technetium or rhenium, together with an aluminum-containing catalytic adjuvant for the olefin reaction. Still another object is to provide a method for converting olefins into other olefins according to the olefin reaction. It is still a further object of this invention to convert terminal olefins to internal olefins by means of double bond isomerization. The provision of a homogeneous coordination catalyst system of manganese, technetium or rhenium together with an aluminum-containing catalytic adjuvant for converting olefins into other olefins of higher and lower number of carbon atoms including rubbery polymers and copolymers is yet another object of the invention. Other aspects and advantages of the invention will be apparent to one skilled in the art upon study of the disclosure including the detailed description of the invention.

According to the process of the invention, cyclic and acyclic olefins, preferably internal, non-tertiary acyclic olefins, and mixtures of these, including mixtures which forms by the admixture, under reaction conditions, of components comprising (a) A VII–B metal complex represented by the formula $$[M_a(L)_bX_a]_x$$

wherein M is rhenium, manganese, or technetium; each X is a halogen; each (L) is represented by the formula $R_3Q$, $R_3QO$, $R_2Q$—$QR_2$, $(CR^4H$—$CR^4$—$CH_2)$, O, $R_3N$, $R_2N$—$R^2$—$NR_2$, R—S—R, 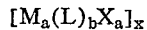

$(R_2NCSS)$, $R^5(CN)_m$, $[(RCO)_2CH]$, substituted and $R^5$ group-substituted pyridine, unsubstituted or $R^5$ group-substituted 2,2'-bipyridine; each R is an aromatic or saturated aliphatic hydrocarbon radical, including alkoxy and halo substituted radicals, having up to 20 carbon atoms; Q is phosphorous, arsenic, or antimony, $R^2$ is a divalent aromatic or saturated aliphatic hydrocarbon radical having up to 20 carbon atoms, $R^3$ is a divalent saturated or ethylenically unsaturated hydrocarbon radical having from 4 to 10 carbon atoms; $R^4$ is hydrogen or a methyl radical; $R^5$ is an aromatic, saturated aliphatic, or ethylenically unsaturated aliphatic radical having up to 30 carbon atoms; $a$ is an integer from 1 to 6; $b$ is an integer from 1 to 3; the number of (L) and X groups present in the complex is not greater than the number required for the metal to achieve the closed shell electronic configuration of the next higher atomic number inrt gas; $x$ is a number indicative of the polymeric state of the complex; $m$ is 1 or 2; with (b) A catalytic adjuvant comprising a compound selected from:

(1) a $R_eAlX_f$ compound,
(2) a mixture of (1) compounds,
(3) a mixture of one or more $R_eAlX_f$ or $AlX_3$ compounds with one or more compounds represented by the formula $R'_gM'X_h$, or
(4) a $AlX_3$ compound, wherein each R is a saturated aliphatic or aromatic organic radical, including alkoxy and halo substituted radicals, having up to 20 carbon atoms; each X is a halogen; each M' is a metal of Group I-A, II-A, II-B or III-A; each R' is hydrogen or R; $e$ is an integer from 1 to 3; $f$ is 0 or an integer from 1 to 2; the sum of $e$ and $f$ is 3; $g$ is an integer from 1 to 3; $h$ is 0 or an integer from 1 to 2; and the sum of $g$ and $h$ is equal to the valence of M'; and when cyclic olefins are converted and the adjuvant is (1), $f$ is preferably 1 or 2.

The groups of metals as referred to herein are those of the Periodic Table of Elements of Handbook of Chemistry and Physics, Chemical Rubber Co., 45th Edition, p. B-2.

In a further embodiment of the invention we have discovered that the above described catalysts are capable of converting terminal acrylic olefins to internal olefins by double bond isomerization. Accordingly, when terminal, acyclic olefins are contacted with the catalyst they undergo double bond isomerization to an internal configuration as the primary reaction. In addition, the internal olefin formed in situ then undergoes the olefin reaction as defined above.

Some examples of $R_eAlX_f$ or $AlX_3$ compounds are methylaluminum dichloride, dimethylaluminum fluoride, methylaluminum sesquichloride, aluminum trichloride, ethylaluminum dichloride, aluminum tribromide, ethylaluminum sesquichloride, di - 2 - (ethylhexyl)aluminum bromide, phenylaluminum dichloride, (di(3-ethoxypropyl)aluminum bromide, benzylaluminum diiodide, di-eicosylaluminum bromide, and the like, and mixtures thereof.

Some examples of the $R_gM'X_h$ compounds are: phenyllithium, t-butylpotassium, methylsodium, benzylrubidium, lithium hydride, anthrylcesium, lithiumaluminum hydride, ethylberyllium hydride, lithium borohydride, methylcadmium chloride, diethylzinc, dicyclohexylmercury, dipropylzine, methylgallium dibromide, triethylaluminum, trieicosylaluminum, triethylindum, di(12-chlorododecyl)aluminum chloride, triisopropylthallium, dimethylcalcium, dimethylstrontium, diethylbarium, and the like, and mixtures thereof. Preferred (b) components of the catalyst system are those of (1) or (2).

The formula $[M_a(L)_bX_c]_x$ is used herein to identify the product obtained by admixture of the rhenium, manganese, or technetium compound with at least one complexing agent. It should be understood, however, that the catalytic agent which has activity for the olefin conversion is the product resulting from the admixture of the metal compound and the complexing agent, and the aluminum-containing compound under catalyst forming conditions whether or not the components are present as indicated by the formula.

In such preparation the molar proportion of Group VII–B metal compound to the selected ligand-forming compound can vary widely but will usually be in the range of from about 0.1:1 to about 10:1, preferably from about 0.2:1 to 5:1. Any convenient temperature can be used for the mixing, avoiding excessively high temperature and excessively low temperatures at which decomposition or crystallization would occur. The temperature will preferably to be in the range of about 0 to about 130° C., more preferably about 20 to about 60° C., for a time in a range of a few seconds to 24 hours, preferably in the presence of a diluent, as hereinafter described.

Some examples of (L) ligands which are applicable in the (a) component of the catalyst system of the present invention are: trimethylphosphine, tributylphosphine, trieicosylphosphine, triphenylphosphine, tribenzylphosphine, tricyclopentylarsine, tributylstibine, dimethylphenylphosphine, diethylphenylarsine, tetramethyldiphosphine, tetrabutyldiarsine, tetraethyldistibine, triphenylphosphine oxide, tricyclohexylphosphine oxide, tributylstibine oxide, triphenylphosphine oxide, trimethylamine, tri-t-butylamine, triphenylamine, tri(6-phenylhexyl)amine, isopropyldiphenylamine, N,N,N',N' - tetramethylethylenediamine, 4-vinylpyridine, pyridine, 2,4-dimethylpyridine, 4,4' - di - t - butyl-2,2'-bipyridine, 2,2'-bipyridine, butyl sulfide, phenyl sulfide, thiophene, 2,5 - diethylthiophene, π-allyl, π-methallyl, π-crotyl, acetylacetonate, 1,3-diphenyl-1,3-propanedionate, 2,4 - hexanedionate, 3,5 - octanedionate, ethylenedinitrile, butyronitrile, 1,2-cyclohexylenedinitrile, dimethyldithiocarbamate, diethyldithiocarbamate, dibutyldithiocarbamate, diphenyldithiocarbate, and the like.

Because of the relative unavailability of technetium, the rhenium and manganese complexes are presently preferred for the Group VII complex (a) components of the catalyst system. Because of their greater reactivity the rhenium complexes are the most preferred of this group.

Some examples of these complexes are:
Re(triphenylphosphine$_2$Cl$_4$,
Re(triphenylphosphine)$_2$OCl$_3$,
Re(triphenylphosphine)$_2$OBr$_3$,
[Re(2,4-pentanedionate)Cl$_2$]$_3$,
Re(pyridine)$_4$I,
[Re(pyridine)Br$_3$]$_3$,
Re(triphenylpohsphine)Br$_3$,
Re(2,2'-bipyridine)OCl,
Re(2,2'-bipyridine)OCl$_3$,
Re(2,2'-bipyridine)Cl$_4$,
Re$_2$(2,2'-bipyridine)Cl$_4$,
Re$_2$(2,2'-bipyridine)$_2$I$_4$,
Re(pyridine)$_2$I$_4$,
Re(pyridine)$_2$Br$_3$,
Re(dimethylphenylphosphine)$_3$Cl$_3$,
Re(diethyldithiocarbamate)$_3$Br$_6$,
Mn(3-picoline)$_2$Br$_2$,
Mn(4-picoline)$_2$Br$_2$,
Mn(pyridine)$_2$Br$_2$,
Mn(triphenylarsine oxide)$_2$Br$_2$,
Mn(triphenylphosphine oxide)$_2$Br$_2$,
Mn(acetonitrile)Br$_2$,
Mn(pyridine)Br$_2$,
Mn(3-picoline)$_2$Cl$_2$,
Mn(pyridine)$_2$Cl$_2$,
Mn(triphenylarsine oxide)$_2$Cl$_2$,
Mn(triphenylphosphine oxide)$_2$Cl$_2$,
Mn(2,6-lutidine)Cl$_2$,
Mn(triphenylphosphine oxide)$_2$I$_2$,
Mn(3-picoline)$_2$Br$_6$,
and the like and mixtures thereof.

The VII complex (a) components can be prepared by procedures which are conventionally known in the art such as by the treatment of VII–B metal halides or oxyhalides with suitable ligand-forming materials. Bromine-containing complexes are presently preferred.

The molar proportion of the (a) component to the (b) component, to form the catalyst system of the present invention, will generally be such that from about 0.1 to about 30, preferably from about 1 to about 20, and still more preferably from about 12 to about 20 moles of the (b) component are used for each mole of the (a) component.

The catalyst is prepared simply by combining the (a) component and the (b) component under conditions of time and temperature which permit the catalytically active reaction product to be formed. Excessively high temperatures at which some of the components tend to decompose or excessively low temperatures at which some of the components tend to crystallize or otherwise tend to become unreactive, should be avoided. In general, the components can be mixed within the broad temperature range of from about —80 to about 75° C., preferably from about 2 to about 12 hours. The contact is preferably carried out in the presence of an inert solvent in which both the components are at least partially soluble, such as hydrocarbons and halogenated hydrocarbons applicable for preparing the complex. Halogenated solvents are preferred and solvents such as benzene, xylene, cyclohexane, isooctane, chlorobenzene, ethylene dichloride, methylene chloride and the like are frequently used. The mixing of the catalyst components is carried out in the substantial absence of air or moisture, generally in an inert atmosphere.

After the catalytic reaction is formed it need not be isolated but can be added directly to the olefin conversion zone as a dispersion in its preparation solvent. It is generally preferred that the catalyst components be combined prior to the contact with the feed olefin.

Olefins applicable for use in the process of the invention are non-tertiary, non-conjugated, acyclic mono- and polyenes having at least 3 carbon atoms per molecule including cycloalkyl and aryl derivatives thereof, cyclic and polycyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having from 3 to 30 carbon atoms per molecule and with such cyclic olefins having 4 to 30 carbon atoms per molecule. Non-tertiary olefins are those wherein each carbon atom, which is attached to another carbon atom by means of a double bond, is also attached to a hydrogen atom. Internal olefins are preferred for the olefin reaction conversion. The above described acyclic olefins having terminal double bonds undergo double bond rearrangement to internal olefins.

Some specific examples of acyclic olefins suitable for reactions of this invention include propylene, 1-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenylbutene-2, allylbenzene, 3-eicosene, 3-hexene, 1,4-pentadiene, 1,4,7-dodecatriene, 4 - methyl - 4 - octene, 4-vinylcyclohexene, 1,5-octadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl-1,4-octadiene, and 3-heptene, and the like, and mixtures thereof.

Some specific examples of cyclic olefins suitable for the reactions of this invention are cyclobutene, cyclopentene, cycloheptene, cyclooctene, 5-n-propylcyclooctene, cyclodecene, cyclododecene, 3,3,5,5 - tetramethylcyclononene, 3,4,5,6,7-pentaethylcyclodecene, 1,5-cyclooctadiene, 1,5,9 - cyclododecatriene, 1,4,7,10-cyclododecatetraene, 4-benzylcyclohexene, 6-methyl-6-ethylcyclooctadiene - 1,4, and the like, and mixtures thereof.

It will be understood by those skilled in the art that not all olefinic materials will be converted in accordance with the olefin reaction by the present invention with equal effectiveness. The reactions described in the present invention are equilibrium-limited reactions and, barring the selective removal of one or more products from the reaction zone, the extent of conversion will depend upon the thermodynamics of the specific system observed. Thus, conversion of olefinic materials to give specific products can be thermodynamically favored while the reverse reaction is very slow and ineffective. For example, 1,7-octatriene is converted to equilibrium-favored products such as cyclohexene and ethylene. The reverse reaction of ethylene and cyclohexene, correspondingly, goes very poorly. Other well-known factors, such as steric hindrance in bulky molecules, significantly and sometimes drastically affect the rates of reaction of some olefins such that extremely long reaction times are required.

The olefin reaction of symmetrical monoolefins with themselves, to give different olefin products, will sometimes proceed very slowly, requiring some double bond migration to take place before the reaction will proceed at a significant rate. For the same reason, the olefin reaction conversion of a mixture of ethylene and a 1-olefin, for example, can be more difficult than the conversion of ethylene with an internal olefin, some double bond isomerization also being required in this instance.

It has also been found that branching also retards the olefin reaction reactivity in proportion to its propinquity to the reacting double bond. Analogously, the presence of inert polar substituents on the olefinic compound appears tolerable only if located some distance from the double bond.

Thus, the present invention is directed primarily to the conversion of those olefins or combination of olefins which are capable of undergoing the olefin reaction to a significant degree when contacted with the catalyst of the present invention under reaction conditions suitable for effecting the olefin reaction.

When terminal acyclic olefins, in the absence of other types of olefins, are contacted with the catalyst the primary reaction involved is double bond isomerization. The internal double bond isomer formed in situ then undergoes the olefin reaction, including disproportionation, as discussed previously. However, the olefin reaction conversion proceeds much more slowly than the isomerization reaction when terminal olefins are present in the reaction mixture.

Presently preferred olefinic feed compounds for the olefin reaction conversion are those contained in the following classes:

(1) Internal acyclic monoolefins, including those with aryl, cycloalkyl, or cycloalkenyl substitutents, having 4–20 carbon atoms per molecule with no branching closer than about the 3-position and no quaternary carbon atoms or aromatic substitution closer than the 4-position to the double bond, and mixtures of such unsubstituted acyclic internal monoolefins. Some examples of these are: butene-2, pentene-2, hexene-2, hexene-3, octene-4, nonene-2, 4-methylpentene-2, decene-3, 8-ethyldecene-2, dodecene-4, eicosene-5, and the like.

(2) Acyclic, nonconjugated polyenes having from 7 to about 20 carbon atoms per molecule, containing from 2 to about 4 internal double bonds per molecule and having at least one double bond with no branching nearer than the 3-position and no quaternary carbon atom nearer than the 4-position to that double bond, or mixtures of such polyenes. Some examples are: 2,5-heptadiene, 2,6-octadiene, 4-methyloctadiene-2,6, 3,6,9,-dodecatriene, and the like.

(3) Cyclopentene.

(4) Monocyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

(5) A mixture of one or more of the monocyclic olefins of (4) with one or more unsubstituted acyclic internal monoolefins of (1). Some examples of these are: hexene-3 and cycloheptene, butene-2 and cyclooctene, butene-2 and cyclodecene, pentene-2 and cyclooctene, heptene-3 and cyclodecene, and the like.

(6) Monocyclic and bicyclic polyenes having from 5 to about 12 ring carbon atoms, including those substituted with up to 3 alkyl groups having up to about 5 carbon atoms, each having at least one double bond with no branching closer than the 3-position and with no quaternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

(7) A mixture of one or more monocyclic polyenes of (6) with one or more of the unsubstituted acyclic internal olefins of (1). Some examples of these are: 1,5-cyclooctadiene and butene-2, 1,5,9-cyclododecatriene and butene-2, 1,5,9-cyclododecatriene and pentene-2, and the like.

(8) Polar group-substituted olefinic compounds of classes (1) through (7) containing from 6 to about 20 carbon atoms per molecule in which the polar group, such as a halogen atom, is sufficiently removed from the active double bond (generally no nearer to the double bond than the 5-position) so as not to interfere with the reaction, and mixtures with unsubstituted members of class (1). Some examples are: 7-chlorooctene-2, and the like.

The presently preferred feed compounds for the double bond isomerization reaction are those contained in the following classes:

(a) Terminal acyclic monoolefins including those with aryl, cycloalkyl, or cycloalkenyl substituents, having 4–20 carbon atoms per molecule with no branching closer than about the 3-position and no quaternary carbon atoms or aromatic substitution closer than the 4-position to the double bond, and mixtures of such unsubstituted or substituted terminal olefins. Some examples are: butene-1, pentene-1, hexene-1, octene-1, nonene-1, 4-methylpentene-1, decene-1, 8-ethyldecene-1, dodecene-1, ecosene-1, and the like.

According to the process of the invention, the olefin or mixture of olefins to be converted in accordance with the olefin reaction or to be converted in accordance with double bond isomerization is contacted with the catalyst system of the present invention at any convenient temperature; however, excessively high or excessively low temperatures should be avoided as stated above. Preferred temperatures are in the range of from about −30 to about 75° C., more preferably from about 0 to 25° C. and at any convenient pressure which is sufficient to maintain a liquid phase. The conversion can be carried out in the presence of an inert solvent or a diluent such as that used for the catalyst preparation. Diluents are not essential but are generally preferred and such diluents can include saturated aliphatic and aromatic hydrocarbons such as cyclohexane, xylene, isooctane and the like, and derivatives thereof. The time of contact will depend upon the desired degree of conversion, and the specific olefin feed stock and catalyst s utilized but will, generally, be in the range of from about 0.1 minute to 20 hours, preferably 5–120 minutes. The proportion of catalyst composition to olefin feed in the reaction zone will generally be such such about 0.001–100 millimoles of Group VII-B metal will be present for each mole of olefin in the reaction zone.

Any conventional contacting technique can be utilized for the olefin conversion, and batchwise or continuous operation can be utilized. After the reaction period the products can be separated and/or isolated by conventional means such as by fractionation, crystallization, adsorption, and the like. Unconverted feed material, or products not in the desired molecular weight range, can be recycled to the reaction zone. If desired, the catalyst can be destroyed by treatment with a sufficient amount of water or alcohol prior to the separation of products to inactivate the catalyst. Otherwise, after separation of products, the catalyst can be recycled to the reaction zone.

The invention can be further illustrated by the following examples:

EXAMPLE I

Disproportionation of pentene-2 over $ReCl_4$(triphenylphosphine)$_2$/ethylaluminum dichloride Into a dry 7-ounce pressure bottle was charged about 0.1 g. of $ReCl_4$-(triphenylphosphine)$_2$, 10 ml. chlorobenzene, 5 ml. pentene-2, and 0.15 ml. ethylaluminum dichloride. The mixture was stirred for 90 minutes at room temperature, hydrolyzed with water, and the olefin content of the organic phase was analyzed by gas-liquid chromatography showing the presence of 2.2 weight percent butenes, 2.9 weight percent hexenes, and 94.8 weight percent pentenes.

EXAMPLE II

Disproportionation of penetene-2 over $ReOCl_3$(triphenylphosphine)$_2$/ethylaluminum dichloride In a test essentially identical to that of Example I except that $ReOCl_3$(triphenylphosphine)$_2$ was used as a rhenium compound, the analysis showed 2.7 weight percent butenes, 3.9 weight percent hexenes, and 93.3 weight percent pentenes.

EXAMPLE III

Disproportionation of pentene-2 over $ReOBr_3$(triphenylphosphine)$_2$/ethylaluminum dichloride In a manner similar to that of Example I, 0.307 g. of $ReOBr_3$(triphenylphosphine)$_2$ and 10 ml. of chlorobenzene was chilled to 0° C. and treated with 4 ml. of a 1 molar solution of ethylaluminum dichloride in chlorobenzene. The solution was then maintained at −12° C. for 21 hours. A 5 ml. quantity of pentene-2 was then added and the homogeneous solution was allowed to warm to room temperature with agitation. After 3 hours a sample of the reaction mixture was analyzed and found to contain about 8.9 percent butenes, about 70.8 percent pentene-2 and about 20.2 percent hexene, by weight, thus illustrating that the catalyst possessed high activity for disproportionation of pentene-2.

EXAMPLE IV

Disproportionation of pentene-2 over rhenium complexes/methylaluminum sesquichloride In a manner similar to the preceding examples additional runs were carried out to illustrate the disproportionation of pentene-2 using methylaluminum sesquichloride (MASC) in place of ethylaluminum dichloride (EADC). In 2 hour run the catalyst system comprising $ReCl_4(triphenylphosphine)_2 + MASC$ was found to provide 1% conversion to $C_4$ and $C_6$ olefins. In an 18 hour run, the catalyst system comprising $ReOCl_3(triphenylphosphine)_2 + MASC$ was found to provide 2% conversion to $C_4$ and $C_6$ olefins. In a 4 hour run, the catalyst system comprising $ReOBr_3(triphenylphosphine)_2 + MASC$ was found to give 31% conversion to $C_4$ and $C_6$ olefins. This example demonstrates that MASC is also a suitable component for catalysts of the present invention.

EXAMPLE V

Isomerization of pentene-1

A 0.2 g. quantity of $ReOBr_3(triphenylphosphine)_2$ was charged into an 8 oz. reaction bottle followed by 10 ml. chlorobenzene, 5 ml. pentene-1, and 3 ml. of chlorobenzene solution containing 3 millimoles of ethylaluminum dichloride. The additions were made in an inert nitrogen atmosphere in the absence of air or moisture. The mixture was stirred at room temperature for about 22 hours then hydrolyzed by the addition of water. Analysis of the organic phase showed that the pentene-1 had been isomerized to a mixture of pentenes containing 18.8% cis-pentene-2, 66% trans-pentene-2, and 15.7% pentene-1, by weight. Trace amounts of butenes and hexenes were also found indicating that some of the pentene-2, prepared in situ, underwent disproportionation.

EXAMPLE VI

Isomerization of octene-1

About 0.1 g. of $ReCl_4(triphenylphosphine)_2$, 10 ml. chlorobenzene, 15 ml. octene-1, and 0.15 ml. ethylaluminum dichloride were charged into an 8 oz. reaction bottle under a nitrogen atmosphere. After stirring at room temperature for 90 minutes, the mixture was hydrolyzed and the organic phase was analyzed by gas-liquid chromatography showing the presence of internal double bond isomers of octene-1.

In another similar run, a reaction mixture containing about 0.1 g. $ReOCl_3(triphenylphosphine)_2$, 10 ml. chlorobenzene, 5 ml. octene-1, and 0.15 ml. ethylaluminum dichloride was stirred 90 minutes at room temperature. Subsequent analysis showed that this catalyst system also converted octene-1 into a mixture of octene isomers.

In the practice of the process of the invention the feed olefins, catalysts and operating conditions disclosed include combinations wherein solid, rubbery materials are produced; for example, if a propylene feed and a suitable aluminum-containing adjuvant such as an organoaluminum dihalide or an organoaluminum sesquihalide are used, a solid, rubbery material is produced having characteristics of ethylene-propylene rubber. This rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among solvents suitable for relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the nonsupported homogeneous catalyst systems.

We claim:

1. A process for converting at least one feed olefin hydrocarbon having at least 3 carbon atoms per molecule or a mixture of at least one such olefin hydrocarbon and ethylene which comprises contacting said feed hydrocarbon or mixture under conditions suitable for converting the feed olefin by the olefin reaction and/or isomerization to a product comprising at least one other olefin with a catalyst system which forms on admixing, under catalyst forming conditions, of components comprising (a) a coordination complex represented by the formula

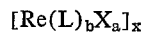

$$[Re(L)_b X_a]_x$$

wherein X is a halogen; L is a ligand selected from $R_3P$ and $[(RCO)_2CH-]$ and, when $b$ is 3 and L is $R_3P$, one L can be 0; each R is an aromatic or saturated aliphatic hydrocarbon radical, including alkoxy and halo-substituted radicals, having up to 20 carbon atoms; $a$ is an integer from 2 to 4; $b$ is an integer from 1 to 3; and $x$ is an integer indicative of the polymeric state of the complex; with (b) a catalytic adjuvant comprising a compound selected from:

(1) $R_eAlX_f$,
(2) a mixture of (1) compounds,
(3) a mixture of one or more (1) compounds with one or more compounds represented by the formula $R'_g M'X_h$, or
(4) a $AlX_3$ compound, whetrein each R is a saturated aliphatic or aromatic organic radical having up to 20 carbon atoms; each X is a halogen; each M' is a metal of Group I-A, II-A, II-B or III-A; each R' is hydrogen or R; $e$ is an integer from 1 to 3; $f$ is 0 or an integer from 1 to 2; the sum of $e$ and $f$ is 3; $g$ is an integer from 1 to 3; $h$ is 0 or an integer from 1 to 2; and the sum of $g$ and $h$ is equal to the valence of M'.

2. The process of claim 1 wherein the feed undergoes the olefin reaction conversion and the feed olefin hydrocarbon is an internal nontertiary, nonconjugated, acyclic mono- and polyene having at least 3 carbon atoms per molecule including cycloalkyl and aryl derivatives thereof, cyclic and polycyclic mono- and polyenes having at least 4 carbon atoms per molecule including alkyl and aryl derivatives thereof; mixtures of the above olefins; or mixtures of ethylene and the above olefins.

3. The process of claim 2 wherein the feed olefin hydrocarbon is selected from the group consisting of
   (1) internal, acyclic monoolefins including those with aryl, cycloalkyl, or cycloalkenyl substituents, having 4 to 20 carbon atoms per molecule with no branching closer to the double bond than the 3-position and no aromatic substitution or quaternary carbon atoms closer to the double bond than the 4-position and mixtures of such unsubstituted internal monoolefins;
   (2) polyenes having from 7 to about 20 carbon atoms per molecule, containing from 2 to about 4 internal double bonds per molecule and having at least one double bond with no branching closer than the 3-position and no quaternary carbon atom closer than the 4-position to that double bond and mixtures of such polyenes;
   (3) cyclopentene;
   (4) cyclic and bicyclic monoolefins having 7 to about 12 ring carbon atoms, including those substituted with up to 3 alkyl groups having up to about 5 carbon atoms, with no branching closer to the double bond than the 3-position and no quaternary carbon atoms closer to the double bond than the 4-position and mixtures of such olefins and mixtures of such olefins and cyclopentene;
   (5) a mixture of one or more of the monocyclic olefins of (4) with one or more unsubstituted, acyclic, internal monoolefins of (1);
   (6) cyclic and bicyclic polyenes having from 5 to about 12 ring carbon atoms, including those substituted with up to 3 alkyl groups having up to about 5 carbon atoms each, having at least one double bond with no branching closer to it than the 3-position and no quaternary carbon atoms closer to it than the 4-position and mixtures of such polyenes; and
   (7) a mixture of one or more of the monocyclic polyenes of (6) with one or more of the unsubstituted acyclic internal olefins of (1).

4. The process of claim 1 wherein the conversion produces a product according to the olefin reaction, which as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each said new pairs being connected by an olefinic double bond.

5. The process of claim 1 wherein the conversion is double bond isomerization and the feed olefin hydrocarbon is a terminal, nontertiary, nonconjugated, acyclic monoolefin.

6. The process of claim 1 wherein the molar ratio of the (b) component of the catalyst to the (a) component of the catalyst is in the range of from about 0.1:1 to about 20:1.

7. The process of claim 1 wherein the conditions for the conversion reaction include a temperature in the range of from about −30 to about 75° C., a pressure which is sufficient to maintain the liquid phase, a time of contact in the range from 0.1 to about 100 hours, and a ratio of catalyst composition to olefin feed of from about 0.001 to 100 millimoles of rhenium metal for each mole of olefin feed.

8. The process of claim 1 wherein the conversion is accomplished in the presence of an inert diluent in which both of the (a) and (b) components of the catalyst are at least partially soluble.

9. The process of claim 1 wherein the catalyst further includes a solid inorganic or organic support or carrier selected from the group consisting of silica, alumina, silica-alumina, titania, boria, zeolites, ion exchange resin, a solid polymer of 4-vinylpyridine and a solid polymer of vinyl dimethylphosphine.

10. The process of claim 1 wherein the feed olefin hydrocarbon is pentene-2, or pentene-1.

11. The process of claim 10 wherein the (a) component is represented by the formula $ReCl_4$(triphenylphosphine)$_2$ and the (b) component is ethylaluminum dichloride, or methylaluminum sesquichloride.

12. The process of claim 10 wherein the (a) component is represented by the formula $ReOCl_3$(triphenylphosphine)$_2$ and the (b) component is ethylaluminum dichloride, or methylaluminum sesquichloride.

13. The process of claim 10 wherein the (a) component is represented by the formula $ReOBr_3$(triphenylphosphine)$_2$ and (b) component is ethylaluminum dichloride, or methylaluminum sesquichloride.

References Cited
UNITED STATES PATENTS

| | | | |
|---|---|---|---|
| 3,379,706 | 4/1968 | Wilke | 260—683.15 |
| 3,457,319 | 7/1969 | Olechowski et al. | 260—677 |
| 3,450,732 | 6/1969 | Wilke et al. | 252—431 |
| 3,409,681 | 11/1968 | Kroll | 260—683.2 |
| 3,341,619 | 9/1967 | Stogryn et al. | 260—683.15 |

DELBERT E. GANTZ, Primary Examiner

C. E. SPRESSER, JR., Assistant Examiner

U.S. Cl. X.R.

260—94.9 B, 658 R, 666 A, 668 R, 677 R, 680 R, 632.2

UNITED STATES PATENT OFFICE

CERTIFICATE OF CORRECTION

Patent No. 3,776,973                          Dated: December 4, 1973

Edmund T. Kittleman and Ernest A. Zuech

It is certified that error appears in the above-identified patent and that said Letters Patent are hereby corrected as shown below:

Column 10, line 46, delete "[(RCO)$_2$CH-]" and insert --- [(RCO)$_2$CH] ---; line 61, delete "whetrein" and insert --- wherein ---; line 61, beginning "wherein each R is a saturated aliphatic or" and running through line 70, "the valence of M'." should be flush with the left-hand margin. Column 11, line 9, after "to" insert --- about ---. Column 12, line 12, after "range" insert --- of ---; line 23, delete "resin" and insert --- resins ---.

Signed and sealed this 23rd day of April 1974.

(SEAL)
Attest:

EDWARD M. FLETCHER, JR.                         C. MARSHALL DANN
Attesting Officer                                Commissioner of Patents